(12) United States Patent
Takehara et al.

(10) Patent No.: US 9,380,839 B2
(45) Date of Patent: Jul. 5, 2016

(54) LOOP SURFACE FASTENER HAVING EXCELLENT POSITIONING FUNCTION

(71) Applicant: KURARAY FASTENING CO., LTD., Osaka-shi (JP)

(72) Inventors: Keiji Takehara, Tokyo (JP); Yukitoshi Higashinaka, Fukui (JP); Satoru Ono, Fukui (JP)

(73) Assignee: Kuraray Fastening Co., Ltd., Osaka-shi (JP)

( * ) Notice: Subject to any disclaimer, the term of this patent is extended or adjusted under 35 U.S.C. 154(b) by 0 days.

(21) Appl. No.: 14/365,186

(22) PCT Filed: Nov. 21, 2012

(86) PCT No.: PCT/JP2012/007484
§ 371 (c)(1),
(2) Date: Jun. 13, 2014

(87) PCT Pub. No.: WO2013/088649
PCT Pub. Date: Jun. 20, 2013

(65) Prior Publication Data
US 2014/0325826 A1    Nov. 6, 2014

(30) Foreign Application Priority Data

Dec. 14, 2011  (JP) ................................ 2011-272897

(51) Int. Cl.
*A44B 1/04*    (2006.01)
*A44B 18/00*   (2006.01)
*D04H 11/00*   (2006.01)

(52) U.S. Cl.
CPC ......... *A44B 18/0011* (2013.01); *A44B 18/0034* (2013.01); *A44B 18/0038* (2013.01);
(Continued)

(58) Field of Classification Search
CPC ........... Y10T 24/2733; A44B 18/0034; A44B 18/0038
See application file for complete search history.

(56) References Cited

U.S. PATENT DOCUMENTS 4,906,020 A * 3/1990 Haberer ..................... 280/749
5,974,635 A   11/1999 Murasaki
(Continued)

FOREIGN PATENT DOCUMENTS

EP    0 604 869 A1    7/1994
EP    1 072 208 A2    1/2001
(Continued)

OTHER PUBLICATIONS

Office Action issued May 28, 2015 in Korean Patent Application No. 10-2014-7018573 (with Summary of the Office Action).
(Continued)

*Primary Examiner* — Robert J Sandy
*Assistant Examiner* — Matthew Sullivan
(74) *Attorney, Agent, or Firm* — Oblon, McClelland, Maier & Neustadt, L.L.P.

(57) ABSTRACT

A loop surface fastener in which numerous looped engaging elements formed from loop yarns inserted in parallel to ground warp yarns are provided upright on one side of a base fabric formed from ground warp yarns and ground weft yarns satisfies all the following requirements 1) to 3). 1) The loop yarn is a multi-filament yarn formed by bundling 5 to 9 filaments of 30 to 45 decitex. 2) The density of the looped engaging elements is in a range of 100 to 200/cm². 3) Loop surfaces of the looped engaging elements are substantially facing in the same direction and the loop surface facing direction is a ground weft yarn direction.

11 Claims, 2 Drawing Sheets

(52) U.S. Cl.
CPC ......... *A44B18/0049* (2013.01); *A44B 18/0061* (2013.01); *D04H 11/00* (2013.01); *A44B 18/0069* (2013.01); *Y10T 24/2767* (2015.01); *Y10T 29/4995* (2015.01)

(56) References Cited

U.S. PATENT DOCUMENTS

| | | | |
|---|---|---|---|
| 6,386,242 B1 * | 5/2002 | Higashinaka et al. | 139/391 |
| 6,565,943 B1 * | 5/2003 | Kondo et al. | 428/100 |
| 8,851,551 B1 * | 10/2014 | Kaufman et al. | 296/97.23 |
| 2013/0133176 A1 | 5/2013 | Takehara et al. | |

FOREIGN PATENT DOCUMENTS

| | | |
|---|---|---|
| JP | 6-52521 U | 7/1994 |
| JP | 11-46811 | 2/1999 |
| JP | 2000-70010 | 3/2000 |
| JP | 2003-125813 | 5/2003 |
| JP | 2010-167938 | 8/2010 |
| JP | 2011-182910 A | 9/2011 |
| KR | 2001-0049866 | 6/2001 |
| WO | WO 2007074791 A1 * | 7/2007 |
| WO | 2012/014667 A1 | 2/2012 |

OTHER PUBLICATIONS

International Search Report issued Feb. 19, 2013, in PCT/JP2012/007484, filed Nov. 21, 2012.

Extended Search Report issued Jul. 7, 2015 in European Patent Application No. 12856648.6.

* cited by examiner

LOOP SURFACE FASTENER HAVING EXCELLENT POSITIONING FUNCTION

CROSS REFERENCE TO RELATED APPLICATION

This application is a 371 of PCT/JP 2012/007484, filed on Nov. 21, 2012, and claims priority to Japanese Application No. 2011-272897, filed on Dec. 14, 2011.

TECHNICAL FIELD

The present invention relates to a loop surface fastener having an excellent positioning function, specifically a loop surface fastener which is hardly engaged even if a male surface fastener and a surface fastener surface of the loop surface fastener are joined and pressed with light force and exhibits a large engagement force first when the two fasteners are pressed with strong force, and a combination of the loop surface fastener and the male surface fastener.

BACKGROUND ART

Conventionally, a method for attaching an object to a surface of a body by fixing a male surface fastener including hook-shaped engaging elements to either one of the body and the object, fixing a loop surface fastener including looped engaging elements to a surface of the other, and joining the both surface fasteners to engage the engaging elements of the both has been used as one of methods for attaching an object to a surface of a body.

For an operation of attaching such a surface fastener to a surface, a method is performed by which one surface fastener is first fixed to a surface of a body, another surface fastener is fixed to a surface of an object and the surfaces of the both surface fasteners are joined and pressed to be engaged. To confirm whether or not the object is accurately attached at a predetermined position at this time, the object fixed with the surface fastener is brought closer to the surface fastener of the body to touch the surface fastener of the object for so-called positioning.

However, in the case of conventional surface fasteners, the both surface fasteners are unnecessarily engaged only by being lightly brought into contact for positioning, and thus accurate positioning cannot be performed. In the event of such unnecessary engagement, it is necessary to disengage the unnecessarily engaged surface fasteners and repeat a positioning operation. Further, if the surface fasteners are directly and strongly attached at appropriate positions of the surfaces of the body and the object by omitting the operation of bringing the both surface fasteners closer for the positioning of the surface fasteners to avoid unnecessary engagement (i.e. if the surface fasteners are directly finally fastened by omitting the positioning), the attached position of the object may deviate from an accurate position, causing a troublesome situation. In disengaging the unnecessary engagement, new unnecessary engagement may occur or the object may be damaged in some cases.

Further, in the case of an object having a large shape, e.g. a ceiling material or a wall material of a house or a ceiling material of an automotive vehicle, a wall surface material or a floor material of a trunk room or the like, it requires huge labor and time to repeat an operation of disengaging unnecessary engagement and positioning again. Further, if an operation of attaching a ceiling material, a floor material and the like has to be performed within a fixed time at an automotive vehicle production line moving at a constant speed, the production line has to be stopped in the event of a failure in positioning, wherefore it is very important to accurately and quickly perform positioning.

To solve such problems, it is necessary that no unnecessary engagement occurs merely by joining both surface fasteners at the time of positioning, and the present inventors found a male surface fastener satisfying such a request and already filed a patent application (patent literature 1).

If the male surface fastener of the invention of the above patent application is used, unnecessary engagement at the time of positioning is drastically reduced, but the present inventors found that an effect of preventing the occurrence of unnecessary engagement at the time of positioning is further improved by selecting a mating loop surface fastener.

Note that although it is known that engagement at the time of positioning is reduced and a strong engagement force is exhibited after final fastening as in the present invention in a so-called hook-loop mixed woven surface fastener in which hook-shaped engaging elements and looped engaging elements are mixedly present on the same surface (patent literature 2), a surface fastener described in this known literature is an improvement of the hook-loop mixed woven surface fastener and cannot be applied to a loop surface fastener on the surface of which only looped engaging elements are present.

Patent literature 1: Japanese Patent Application No. 2010-167938
Patent literature 2: Japanese Patent Publication No. 2003-125813

SUMMARY OF INVENTION

The present invention solves a problem of conventional loop surface fasteners that positioning is very difficult because the loop surface fastener is engaged merely by being joined and aims to provide a loop surface fastener having such a positioning function that the loop surface fastener is hardly engaged merely by being joined and exhibits strong engagement at the time of final fastening.

The present invention solves the above problem and one aspect thereof is directed to a loop surface fastener in which numerous looped engaging elements formed from loop yarns inserted in parallel to ground warp yarns are provided upright on one side of a base fabric formed from ground warp yarns and ground weft yarns, and all the following requirements 1) to 3) are satisfied:

1) The loop yarn is a multi-filament yarn formed by bundling 5 to 9 filaments of 30 to 45 decitex,
2) The density of the looped engaging elements is in a range of 100 to 200/cm$^2$,
3) Loop surfaces of the looped engaging elements are substantially facing in the same direction and the facing direction is a ground weft yarn direction.

If the loop surface fastener of the present invention is used, no strong engagement occurs at the time of positioning and strong engagement is obtained after final fastening. As a result, positioning at the time of attaching the surface fasteners is facilitated and an engagement force comparable to those of conventional loop surface fasteners can be obtained after final fastening.

DESCRIPTION OF EMBODIMENTS

Figure 1:
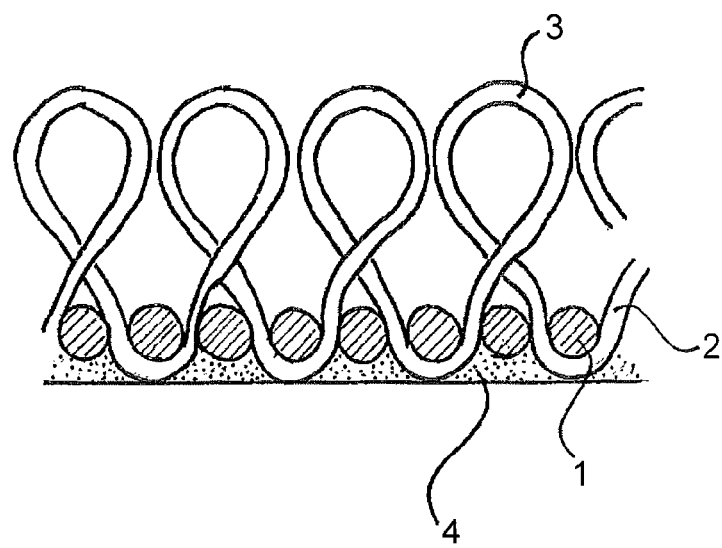
FIG. 1 is a diagram showing a cross-section of an example of a loop surface fastener of the present invention parallel to a ground warp yarn direction when viewed in a ground weft yarn direction.

Hereinafter, preferred embodiments of the present invention are described using FIGS. 1 to 4. FIG. 1 is a diagram showing a cross-section of an example of a loop surface fastener of the present invention parallel to a ground warp yarn direction when viewed in a ground weft yarn direction. In FIG. 1, ground weft yarns are denoted by 1, a loop yarn is denoted by 2, looped engaging elements are denoted by 3 and a back coat resin layer is denoted by 4.

Generally, the loop surface fastener is formed from ground warp yarns, ground weft yarns and loop yarns for forming looped engaging elements. The looped engaging elements formed from the loop yarns are provided upright on a base fabric formed from these yarns, and the elements project from one surface of the base fabric. A back coat resin for preventing the looped engaging elements from being pulled out from the base fabric is applied to the underside of the base fabric, thereby fixing the loop yarns to the base fabric.

In this embodiment, such a loop surface fastener is not strongly engaged at the time of positioning described above and provides strong engagement after final fastening by satisfying the following requirements:

1) The loop yarn is a multi-filament yarn formed by bundling 5 to 9 filaments of 30 to 45 decitex.

2) The density of the looped engaging elements is in a range of 100 to 200/cm$^2$.

3) Loop surfaces of the looped engaging elements are substantially facing in the same direction and the facing direction is a ground weft yarn direction.

Conventionally, a multi-filament formed by bundling a plurality of filaments has been used as a loop yarn of a loop surface fastener. Specifically, a multi-filament yarn formed by bundling 12 to 18 filaments of 15 to 20 decitex has been used. Contrary to that, in this embodiment, a multi-filament yarn formed by bundling a smaller number of thicker filaments than the conventional ones, i.e. by bundling 5 to 9 filaments of 30 to 45 decitex is used. Unnecessary engagement at the time of positioning can be prevented by using such multi-filament yarns formed by bundling a smaller number of thick filaments. If the filaments are thinner than 30 decitex or the number of the bundled filaments is smaller than 5, male engaging elements as engagement mates easily enter the loops to cause engagement at the time of positioning. Further, if the filaments are thicker than 45 decitex or the number of the bundled filaments is larger than 9, a strong engagement force is not produced at the time of final fastening. The loop yarn is preferably a multi-filament yarn formed by bundling 6 to 8 filaments of 32 to 42 decitex, more preferably a multi-filament yarn formed by bundling 7 filaments of 34 to 40 decitex.

Further, it is important in this embodiment that the density of the looped engaging elements is in the range of 100 to 200/cm$^2$. Conventional commercially available loop surface fasteners have a looped engaging element density of 40 to 70/cm$^2$, and the density of the looped engaging element density specified in this embodiment can be said to be very high. By setting a very high engaging element density, the entrance of the male engaging elements into the loops of the looped engaging elements at the time of positioning can be prevented. Specifically, unnecessary engagement occurs at the time of positioning if the density is less 100/cm$^2$. On the other hand, if the density exceeds 200/cm$^2$, it is difficult to manufacture a loop surface fastener using the multi-filament yarns as described above as loop yarns. The density is preferably in a range of 110 to 180/cm$^2$, more preferably in a range of 120 to 170/cm$^2$. The density of the looped engaging elements mentioned in this embodiment means the number of projections of the multi-filament yarns forming the looped engaging elements from the base fabric surface, and a loop formed from the multi-filament is counted as one looped engaging element.

Furthermore, in this embodiment, it is important that the loop surfaces of the looped engaging elements are substantially facing in the same direction and the facing direction is the ground weft yarn direction. In the case of a conventional loop surface fastener, multi-filament yarns forming looped engaging elements are loosened by napping the loop surface fastener to increase an engagement force. Particularly, in the case of a surface fastener having a high density of looped engaging elements, napping is essential to make male engaging elements easily entangled with looped engaging elements, but loop surfaces of the looped engaging elements are twisted by this napping to face in various directions. Moreover, in the case of a conventional surface fastener made of polyester fibers, a heating treatment is applied at about 220° C. in a final stage of a manufacturing process for the purpose of eliminating the distortion of the fibers caused when the surface fastener was manufactured. By this treatment, looped engaging elements are also twisted and thus loop surfaces of the individual looped engaging elements face in arbitrary directions.

In this embodiment, it is important that the loop surfaces of the looped engaging elements are substantially facing in the same direction and the facing direction is the ground weft yarn direction, specifically unnecessary engagement at the time of positioning can be prevented by the presence of the looped engaging elements facing in the same direction. To align the facing directions of the loop surfaces of the looped engaging elements with the ground weft yarn direction, it is important that the surface fastener is not napped unlike conventional loop surface fasteners. Note that that the loop surfaces of the looped engaging elements are substantially facing in the same direction and the facing direction is the ground weft yarn direction means, in this embodiment, that the loop surfaces of 80% or more of the looped engaging elements present on the loop surface fastener are facing in the ground weft yarn direction or in directions in a range of ±30 ° with respect to a direction perpendicular to the ground weft yarn direction. Preferably, the loop surfaces of 90% or more of the looped engaging elements are facing in the directions in the above range. Also preferably, the loop surfaces are facing in the ground weft yarn direction or in directions in a range of ±20° with respect to the direction perpendicular to the ground weft yarn direction.

Generally, yarns made of polyamide-based fibers represented by nylon 6 and nylon 66, polyolefin-based fibers such as polyethylene fibers and polypropylene fibers and polyester-based fibers such as polyethylene terephthalate fibers, polybutylene terephthalate fibers and polylactic acid fibers are used as ground warp yarns, ground weft yarns and yarns for looped engaging element for forming a loop surface fastener in terms of strength, elasticity, deformation recovery property and the like. Preferably, multi-filament yarns formed from these fibers are used. In particular, if the multi-filament yarns forming the looped engaging elements are made of polybutylene terephthalate-based polyester and both the ground warp yarns and the ground weft yarns are multi-filament yarns made of polyethylene terephthalate-based polyester in this embodiment, it is preferable since the penetration of the male engaging elements into the looped engaging elements when the surface fasteners are light pressed can be prevented.

Polybutylene terephthalate-based polyester and polyethylene terephthalate-based polyester mentioned in the present specification are polyesters mainly containing butylene terephthalate units or ethylene terephthalate units, and a small number of copolymer units may be contained if it does not impair the properties of polybutylene terephthalate or polyethylene terephthalate. Further, a small amount of another copolymer may be blended to such an extent as not to hinder effects of the present invention or it may be mix-spun fibers with other copolymer. Furthermore, colorants such as pigments and dyes, various stabilizers and the like may be added.

The ground warp yarns and the ground weft yarns are preferably twisted to enhance a weaving property. Preferably, S-twisted ground yarns and Z-twisted ground yarns are alternately arranged for shape stability of the surface fastener.

In a preferred embodiment, a multi-filament of 120 to 200 decitex formed from 20 to 40 filaments is used as the ground warp yarn, whereas a multi-filament of 60 to 150 decitex formed from 15 to 30 filaments is used as the ground weft yarn. More preferably, the ground weft yarn is a multi-filament formed from a smaller number of filaments and thicker than those of the ground warp yarn. By using such a combination of the ground warp yarns and the ground weft yarns, the density of the looped engaging elements is increased and the loop surfaces can be easily adjusted to face in the same direction.

The multi-filaments for looped engaging element are woven into a ground texture parallel to the ground warp yarns. Further, the multi-filaments for looped engaging element are preferably woven into the ground texture parallel to the ground warp yarns so as not cross the ground warp yarns. If they cross the ground warp yarns, it is difficult to align the loop surfaces of the looped engaging elements. The multi-filaments for looped engaging element are evenly woven preferably at a ratio of one multi-filament to 2 to 6 ground warp yarns, more preferably at a ratio of one multi-filament to 4 ground warp yarns to combine a positioning function and an engagement force at the time of final fastening.

The number of woven ground warp yarns with the addition of the yarns for looped engaging element is 50 to 100/cm, particularly preferably 60 to 85/cm. Further, the number of woven ground weft yarns are 10 to 30/cm, particularly 15 to 25/cm. A plain woven structure is generally used as a woven structure.

If the woven structure is the plain woven structure, the multi-filament yarn for forming the looped engaging elements immediately emerges to a fabric surface and crosses over the next ground weft yarn after slipping under one ground weft yarn, then immediately sinks to slip under the next ground weft yarn and emerges to cross over the next ground weft yarn. The multi-filament yarn repeatedly makes the above movement. In this embodiment, the density of the looped engaging elements needs to be increased and, to this end, one looped engaging element is preferably formed every time the multi-filament yarn emerges above the adjacent ground weft yarn after slipping under one ground weft yarn. Specifically, the multi-filament yarn for looped engaging element preferably forms one looped engaging element every time emerging above the ground weft yarn. It is also possible to form one looped engaging element every time the multi-filament for looped engaging element sinks and emerges through 3 to 10 ground weft yarns. However, in such a case, it is difficult to increase the engaging element density and form the loop surface fastener of this embodiment.

In this embodiment, the height of the looped engaging element from the base end (height from a surface of the base fabric on the engaging element side) is preferably in a range of 1.5 to 2.8 mm, more preferably in a range of 2.0 to 2.5 mm. The engagement force at the time of final fastening is low if the height is lower than 1.5 mm, whereas the engaging elements are easily inclined or fall down and it is difficult to align the loop surfaces in the same direction if the height is higher than 2.8 mm.

Further, in this embodiment, the looped engaging elements are preferably formed from the multi-filaments in a state kept bundled to prevent unnecessary engagement at the time of positioning. In the case of the conventional loop surface fastener, the surface fastener surface is rubbed by a napper to increase the engagement force and the loop surfaces of the looped engaging elements are caused to face in irregular arbitrary directions as described above. If such a napping process is performed, some of the constituent filaments of the multi-filament yarns forming the looped engaging elements are pulled out from the loops, whereby the bundled state is lost. If the bundled state is lost and some filaments project from the multi-filaments, the male engaging elements are engaged with these projecting filaments to cause engagement at the time of positioning. Thus, in this embodiment, the looped engaging elements preferably form the loops in the state kept bundled.

In the loop surface fastener of this embodiment, an adhesive is applied as a back coat layer to the underside (surface opposite to the one where the engaging elements are present) to prevent the engaging elements from being pulled out from the base fabric when the engagement is disengaged. Examples of a resin for the back coat layer to be applied may include polyurethane-based or acryl-based resins, but the polyurethane-based resin is more preferable in terms of pull-out resistance. The amount of the resin to be applied is 20 to 50 $g/m^2$, preferably 30 to 40 $g/m^2$ by solid content.

Instead of the method for applying the back coat resin to the underside or to more strongly prevent the pull-out of the engaging elements from the base fabric, it is also possible to use a method for replacing some of fibers constituting the surface fastener by thermally fusible fibers and fixing the base ends of the looped engaging elements by fusing these thermally fusible fibers. In this case, the thermally fusible fibers are preferably used as ground weft yarns. However, if high heat is applied to the surface fastener to fuse the thermally fusible fibers, the loops of the looped engaging elements are twisted and the loop surfaces do not face in the same direction. Thus, it is preferable not to increase the temperature of the looped engaging elements to or above a temperature lower than a melting point of the constituent fibers by more than 40° C.

Examples of the mating male surface fastener to be engaged with such a loop surface fastener include surface fasteners having normal hook-shaped engaging elements, specifically woven surface fasteners including hook-shaped mono-filaments on a surface, woven surface fasteners having mushroom-shaped engaging elements on a surface, molded surface fasteners having mushroom-shaped engaging elements on a surface and various other surface fasteners. Above all, a male molded surface fastener is preferable in which numerous male engaging elements are provided upright on a surface of a plastic base plate, each male engaging element includes a stem standing up from the plastic base plate and engaging projections laterally projecting from the stem, a ratio (D/H) of a distance (D) from a top part of the engaging element to lower end parts of the projections to a height (H) of the engaging element from the base plate is 0.35 to 0.75, and a base plate covering ratio of the engaging element is 25 to 45%.

Since this male molded surface fastener itself can also prevent unnecessary engagement at the time of positioning, the occurrence of unnecessary engagement at the time of positioning can be further prevented if this male molded surface fastener is used in combination with the above loop surface fastener.

The present applicant already filed Japanese Patent Application No. 2010-167938 on such a male molded surface fastener. Although the detail of the male molded surface fastener is explained in this previous application, it is briefly described below.

Figure 2:
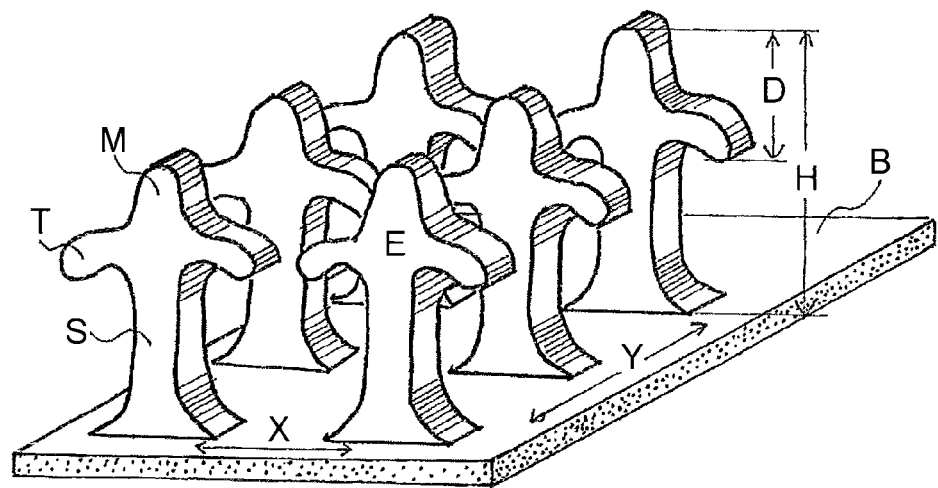
FIG. 2 is a perspective view of a male surface fastener as a preferred engagement mate of the loop surface fastener of the present invention.

Specifically, a preferred example of such a male molded surface fastener includes a male surface fastener as shown in FIG. 2. In FIG. 2, a base plate of the molded surface fastener is denoted by B, male engaging elements are denoted by E and the male engaging elements (E) stand approximately vertically on the base plate (B). The male engaging element (E) includes a stem (S) standing up from the base plate and engaging projections (T) laterally projecting from an upper part of the stem (S), and an adhesion preventing projection (M) is provided on a tip part of the stem in the case of the male engaging element (E) of FIG. 2.

A collection of the engaging projections (T), a stem part above the base ends of the projections (T) and the adhesion preventing projection (M) may be referred to as a head portion of the engaging element in the male engaging element (E). Thus, the male engaging element can also be said to be composed of a stem portion including no engaging projection on sides and the head portion present above this stem portion.

In the male molded surface fastener suitably used in this embodiment, a plurality of such engaging elements are generally arranged in a row at regular intervals in a longitudinal direction (Y direction shown in FIG. 2) (i.e. arranged in a direction of surfaces where the engaging projections do not project), and such rows are also present in parallel in a lateral direction (X direction shown in FIG. 2).

Both the base plate (B) and the male engaging elements (E) are made of plastic. Although the base plate (B) and the male engaging elements (E) may be made of different resins, they are generally made of the same resin in terms of productivity.

The resin used is not particularly limited and examples thereof may include resins normally used for molding, e.g. polyolefin-based resins such as polyethylene and polypropylene, nylon-based resins such as nylon 6 and nylon 66, polyester-based resins such as polyethylene terephthalate, polybutylene terephthalate and polylactic acid, polyvinyl chloride-based resins, styrene-based resins and acryl-based resins. Besides these, examples of this resin may be polyester-based elastomer resins, polyolefin-based, polystyrene-based and polyurethane-based elastomer resins and these may be copolymers. Further, a single resin may be used or two or more kinds of resins may be used by being blended.

Above all, fiber-forming and drawable resins are preferable and specific examples thereof may include polyolefins such as polyethylene and polypropylene, nylons and polyesters. Further, in the case of such a male molded surface fastener, the head portions of the male engaging elements are hardly inclined and the engaged looped engaging elements are hardly detached. Thus, if the male molded surface fastener is forcibly peeled, the looped engaging elements tend to be broken. To prevent this, the male molded surface fastener is also preferably made of an elastomer resin.

As described above, the engaging elements of the molded surface fastener are formed such that the ratio (D/H) of the distance (D) from the top part of the engaging element (E) to the lower end parts of the engaging projections (T) to the height (H) of the engaging element is 0.35 to 0.75 and is quite higher than those of conventional ones.

The male engaging element (E) includes the stem (S) and the engaging projections (T) laterally projecting from this stem, and generally the engaging projections (T) are preferably symmetrically project toward opposite sides. The stem (S) normally stands upright from the base plate (B). The engaging projections (T) project in parallel to the base plate or in such directions that tip parts thereof are lowered toward the base plate rather than being parallel to the base plate as shown in FIG. 2 to increase the engagement force.

As just described, the male molded surface fastener suitable as the engagement mate of the loop surface fastener of this embodiment is formed such that the ratio (D/H) of the distance (D) from the top part of the engaging element (E) to the lower end parts of the engaging projections (T) to the height (H) of the engaging element is quite high such as 0.35 to 0.75 as described above. In conventionally known molded surface fasteners, a ratio (D/H) of a distance from a top part to lower end parts of engaging projections is in a range of 0.15 to 0.25.

In the case of a molded surface fastener including extremely short engaging elements, engaging projections become invariably thin if the value of (D/H) is made smaller, whereby the engaging projections are easily bent and a necessary engagement force cannot be obtained. Thus, if the height (H) of the engaging elements exceeds 1.2 mm although there exist engaging elements having a high value of (D/H), a range of 0.20 to 0.30 is adopted and engaging elements having the value of (D/H) exceeding 0.35 are not known.

FIG. 2 shows the preferred example of the male molded surface fastener used in this embodiment. In the engaging element of FIG. 2, the adhesion preventing projection (M) is provided on the top part of the engaging element to increase this value of (D/H). Of course, the adhesion preventing projection needs not be provided on the top part of the engaging element and may project from the engaging projection (T) in a direction away from the base plate. Further, it is not necessary to provide one adhesion preventing projection for one engaging element and a plurality of adhesion preventing projections may be present on one engaging element.

Further, the adhesion preventing projection needs not be perpendicular to the base plate surface as long as it projects in a direction away from the base plate. Furthermore, one or more adhesion preventing projections are preferably present on each engaging element, but also one adhesion preventing projection may be provided for two to three engaging elements adjacent in the direction of the engaging projections of the engaging elements. Further, besides providing the adhesion preventing projection on the top part of the engaging element in this way, the head portion of the engaging element may be made extremely thick to increase the value of D/H.

The height of the adhesion preventing projection or the thickness of the head portion of the engaging element is a value at which (D/H) described above is in the range of 0.35 to 0.75. Specifically, the adhesion preventing projection may be provided or the head portion may be thickened so that (D/H) has a value of 0.35 to 0.75. If the value of (D/H) is below 0.35, engagement easily occurs at the time of positioning. On the other hand, if this value exceeds 0.75, strong engagement is hindered also after final fastening and a desired engagement force cannot be obtained. The value is preferably in a range of 0.40 to 0.70, more preferably in a range of 0.45 to 0.65.

If the adhesion preventing projections are provided, hand feeling of the surface fastener becomes poor when tip parts of the adhesion preventing projections are sharpened. Thus, the adhesion preventing projections preferably having a rounded shape are present on the head portions as shown in FIG. 2. The adhesion preventing projections are preferably made of the same resin as the stems and the head portions.

If a plurality of engaging projections are present in a vertical direction on each of the opposite sides of the stem, the distance (D) from the top part of the engaging element (E) to the lower end parts of the engaging projections (T) mentioned in this embodiment is a distance from the lower end part of the uppermost engaging projection.

Although it is preferable in preventing the occurrence of unnecessary engagement at the time of positioning that the ratio (D/H) of the distance (D) from the top part of the engaging element (E) to the lower end parts of the engaging projections (T) to the height (H) of the stem is in the range as described above, the base plate covering ratio of the engaging element is considered as an important point similarly to this ratio of (D/H). It is important that this value is in a range of 25 to 45%. Considering that a base plate covering ratio of an engaging element is 15 to 22% in the case of conventionally generally known male molded surface fasteners, the value of 25 to 45% can be said to be extremely high. If the base plate covering ratio of the engaging element is below 25%, engagement easily occurs at the time of positioning. Conversely, if the base plate covering ratio exceeds 45%, strong engagement is hardly obtained also after final fastening. The base plate covering ratio is preferably in a range of 27 to 42%, more preferably in a range of 28 to 40%.

The base plate covering ratio of the engaging element mentioned in this embodiment is a ratio of the area of the head portion of the male engaging element viewed from above to the area of a base plate part on which the male engaging element stands. In particular, the base plate covering ratio of the engaging element is obtained by photographing a part where the male engaging elements are successively present from above by an optical microscope, enclosing an arbitrary part of base plate where 50 male engaging elements are present in the obtained picture, determining the area of the enclosed part (s1) and a total (s2) of the areas of the upper surfaces of the head portions of the 50 male engaging elements present in this part and calculating $[(s2)/(s1)] \times 100$.

Figure 3:
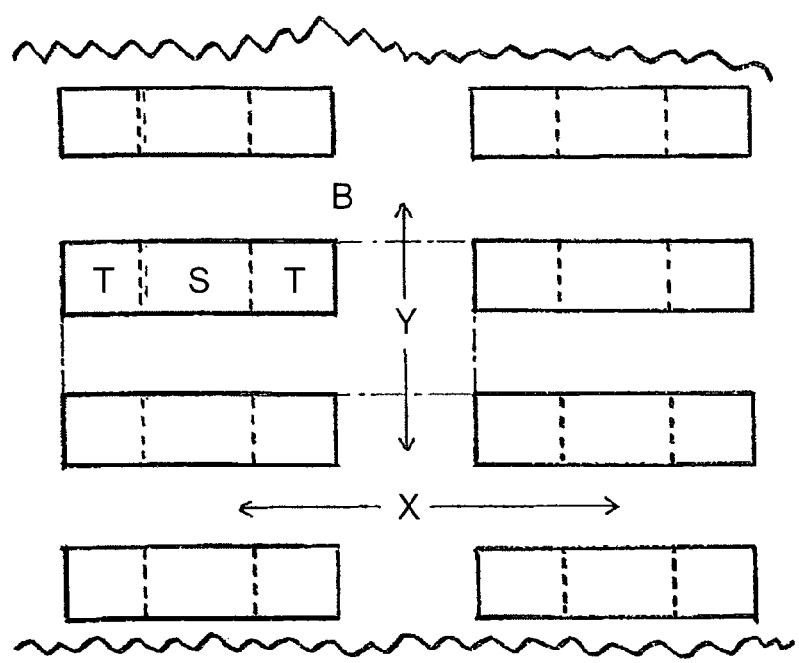
FIG. 3 is a top view of an example of the male surface fastener as the preferred engagement mate of the loop surface fastener of the present invention showing a base plate covering ratio of an engaging element defined in the present invention.

FIG. 3 is a diagram when a part where the engaging elements are successively present is photographed from above by the optical microscope. In FIG. 3, the stem is denoted by S, the engaging projections are denoted by T and the base plate is denoted by B. Further, X and Y directions of FIG. 3 match the X and Y directions of FIG. 2. If the engaging elements regularly stand on the base plate as shown in FIG. 3, the base plate covering ratio of the engaging element is obtained by drawing a rectangle having an end part of one engaging element as one side and those adjacent edges as other side as shown in FIG. 3 (rectangle shown in dashed-dotted line in FIG. 3), and calculating a ratio of the area of one engaging element (S+2T) viewed from above to the area of this rectangle. In the case of FIG. 3, the base plate covering ratio of the engaging element is 30.3%.

Further, a distance between the engaging projection of the male engaging element and the engaging projection of the adjacent male engaging element in the projection direction (i.e. X direction shown in FIG. 3) is suitably in a range of 0.6 to 2.5 mm. If this distance is shorter than 0.6 mm, a sufficient engagement force cannot be obtained. If this distance is longer than 2.5 mm, it is difficult to achieve the base plate covering ratio of the male engaging element described above.

Further, the height (H) of the male engaging element is preferably 1.2 to 3.0 mm. If the height is shorter than 1.2 mm, a sufficient engagement force cannot be obtained. If the height is longer than 3.0 mm, the male engaging element easily falls down and is easily engaged with the looped engaging element with light force, which is not preferable. The height is more preferably in a range of 1.5 to 2.7 mm, even more preferably in a range of 1.6 to 2.6 mm.

Further, in this embodiment, the engaging projections preferably project 0.2 to 0.8 mm from the stem. If the projections are shorter than 0.2 mm, a sufficient engagement force cannot be obtained. If the projections are longer than 0.8 mm, engagement becomes too strong and the element or the loop is broken at the time of peeling. The projections are more preferably 0.3 to 0.6 mm. The engaging projections are normally made of the same resin as the stem.

Further, the thickness of the male engaging element in an engaging element row direction is preferably in a range of 0.15 to 0.6 times the height (H) of the male engaging element. If the thickness is shorter than 0.15 times the height, the strength of the male engaging element becomes too low and a sufficient engagement force cannot be obtained. Also if the thickness is longer than 0.6 times the height, engagement with the looped engaging element is difficult and a sufficient engagement force cannot be obtained. The thickness is more preferably in a range of 0.18 to 0.5 times the height.

Further, the stem portion of the male engaging element is preferably so dimensioned that a cross-section area along a plane which is parallel to the base plate is 0.09 to 0.4 $mm^2$ for the same reason as the thickness of the engaging element in the engaging element row direction.

The thickness of the base plate (B) is not particularly limited, but is suitably in a range of 0.15 to 0.8 mm. Further, the engaging element density is preferably in a range of 20 to 50/$cm^2$, more preferably 30 to 40/$cm^2$.

Next, a method for manufacturing such a male molded surface fastener is described.

Figure 4:
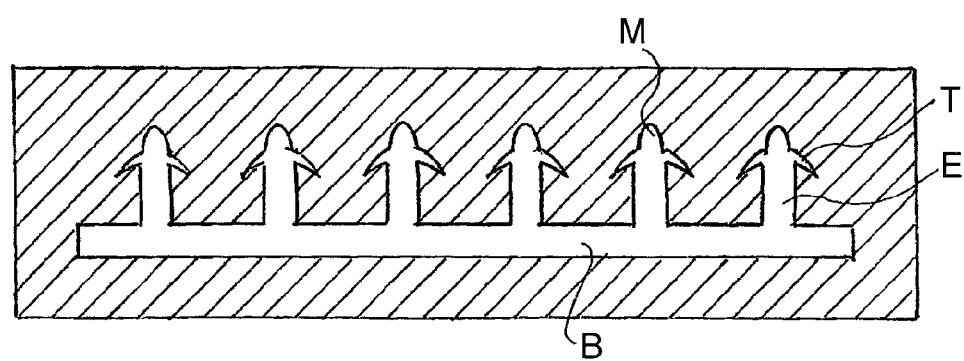
FIG. 4 is a front view of a preferred example of an extrusion nozzle used in manufacturing the male surface fastener as the preferred engagement mate of the loop surface fastener of the present invention.

First, a thermoplastic resin is melted and extruded from a nozzle including a slit as shown in FIG. 4 and cooled, thereby molding a tape-like object including a plurality of continuous rows having a cross-section of mushroom-shaped engaging elements standing on a base plate surface perpendicularly to a base plate and successive in a length direction. Denoted by B in FIG. 4 is a linear slit for forming the base plate. Denoted by E are engaging element slits for forming male engaging elements. In the case of using the slit as shown in FIG. 4, the tape-like object is obtained in which six continuous rows for male engaging element standing upright on the base plate surface and each including an adhesion preventing projection are present at equal intervals. The number of the continuous rows is preferably 5 to 15 per 1 cm of a tape width after stretching. Further, the tape width is preferably 20 to 50 mm.

Subsequently, cuts are formed at small intervals from the tip of the continuous row to the vicinity of the base end of the continuous row in a direction crossing, preferably perpendicular to a continuous row length direction in each continuous row for engaging element which is present on the surface of the obtained tape-like object. The interval of the cuts is 0.2 to 0.6 mm, suitably in a range of 0.3 to 0.5 mm. Then, the tape-like object is drawn in a length direction. A stretching ratio adopted is such that the length of the stretched tape-like object is about 1.3 to 3.5 times the length of the original tape-like object. By this stretching, the cuts formed in the continuous row are widened and the continuous rows become independent numerous male engaging element rows.

To increase the value of the ratio (D/H) of the distance (D) from the top part of the engaging element to the lower end parts of the projections to the height (H) of the engaging element from the base plate, the head portion of the engaging element slit (F) shown in FIG. 4 may be thickened or a cut portion (M) corresponding to the adhesion preventing projection may be provided on the stem as shown in FIG. 4. Further, an increase in the base plate covering ratio of the engaging element can be achieved such as by causing the head portion of the engaging element slit of the nozzle shown in FIG. 4 to protrude toward the opposite sides, by narrowing an interval between the adjacent engaging element slits and further by reducing the stretching ratio.

Since the loop surface fastener of this embodiment and the combination of this surface fastener and the said male molded surface fastener do not cause strong engagement at the time of positioning, but provide strong engagement after final fastening, they are suitably used in a field where positioning is necessary, e.g. suitably used in the field of fixing portions such as wall materials, floor materials and ceiling materials.

Particularly, as described above, at the time of producing an automotive vehicle, if a wrong fixing position is chosen in an operation of fixing a ceiling material as an interior material to a ceiling base material of the automotive vehicle or an operation of fixing a molded material for forming a trunk room to a position for the trunk room of the automotive vehicle at a production line moving at a constant speed, an operation of disengaging the engagement and fixing the material again is necessary. This disrupts the production line and necessitates an action such as a reduction in the speed of the production line. However, if the loop surface fastener of this embodiment, preferably the combination of the loop surface fastener and the male molded surface fastener is used as a means for attaching the ceiling material to the ceiling base material or attaching the molded material for forming the trunk room, the occurrence of unnecessary engagement at the time of positioning can be prevented and the positioning operation becomes easier. Thus, the occurrence of displacements can be reduced.

Further, if the loop surface fastener of this embodiment, preferably the combination of the loop surface fastener and the male molded surface fastener is used for a ceiling material and a wall material in interior finishing of a house or the like, it is possible to prevent displacements, reduce labor hours and prevent the damage of the ceiling material and the wall material in detaching the displaced ceiling material and the wall material. Particularly, if an object to be attached has a large shape, the effect of using the male molded surface fastener of this embodiment is very remarkable.

As just described, the loop surface fastener of this embodiment is quite excellent as a fixing means in fixing an object having a large area at a predetermined position and provides a particularly excellent merits, for example, when the object to be attached is a sheet having an area of 0.1 m$^2$ or larger, particularly 0.2 m$^2$ or a plate-like object.

The loop surface fastener of this embodiment is attached to the underside of an object or a base material surface by an adhesive, a pressure-sensitive adhesive, fusion, sewing, stapling or the like. On the other hand, the male molded surface fastener is similarly attached to the underside of the object or to the base material surface by an adhesive, a pressure-sensitive adhesive, fusion, sewing, stapling or the like.

Various techniques are disclosed herein as described above. Among them, main techniques are summarized below.

A loop surface fastener according to one aspect of the present invention is a loop surface fastener in which numerous looped engaging elements formed from loop yarns inserted in parallel to ground warp yarns are provided upright on one side of a base fabric formed from ground warp yarns and ground weft yarns, and all the following requirements 1) to 3) are satisfied:

1) The loop yarn is a multi-filament yarn formed by bundling 5 to 9 filaments of 30 to 45 decitex.

2) The density of the looped engaging elements is in a range of 100 to 200/cm$^2$.

3) Loop surfaces of the looped engaging elements are substantially facing in the same direction and the facing direction is a ground weft yarn direction.

By such a configuration, the loop surface fastener can be obtained which does not cause strong engagement at the time of positioning and provides strong engagement after final fastening. As a result, positioning at the time of attaching the surface fastener is facilitated and, in addition, there is an advantage of obtaining an engagement force comparable to those of conventional loop surface fasteners after final fastening.

Further, in the above loop surface fastener, the multi-filament yarns forming the looped engaging elements are preferably made of polybutylene terephthalate-based polyester, and both the ground warp yarns and the ground weft yarns are preferably multi-filament yarns made of polyethylene terephthalate-based polyester.

This can prevent the penetration of male engaging elements into the looped engaging elements when the surface fasteners are lightly pressed.

Further, in the above loop surface fastener, the multi-filament yarns forming the looped engaging elements are preferably inserted into a base fabric in parallel to the ground warp yarns so as not to cross the ground warp yarns since loop surfaces of the looped engaging elements are easily aligned.

Furthermore, in the above loop surface fastener, the looped engaging element is preferably formed every time the loop yarn slips under one ground weft yarn and emerges above the adjacent ground weft yarn. This can increase the density of the looped engaging elements.

Further, in the above loop surface fastener, if the height of the looped engaging elements from a base fabric surface is 1.5 to 2.8 mm, a sufficient engagement force can be obtained at the time of final fastening and the loop surfaces are easily aligned in the same direction.

Further, in the above loop surface fastener, the looped engaging elements are preferably formed from multi-filament yarns in a state kept bundled to prevent the occurrence of unnecessary engagement at the time of positioning.

Another aspect of the present invention relates to a method for fixing a ceiling material to a ceiling base material by fixing the loop surface fastener to either one of the ceiling base material and the ceiling material, attaching a surface fastener engageable with the loop surface fastener to the other and engaging the both surface fasteners in the case of fixing the ceiling material to the ceiling base material. In such a method, the ceiling base material is preferably a ceiling base material of an automotive vehicle.

Yet another aspect of the present invention relates to a combination of the loop surface fastener and a male surface fastener as an engagement mate of the loop surface fastener, wherein the male surface fastener includes numerous male engaging elements provided upright on a surface of a plastic base plate, each male engaging element includes a stem standing up from the plastic base plate and an engaging projection laterally projecting from the stem, a ratio (D/H) of a distance (D) from a top part of the engaging element to a lower end part of the projection to a height (H) of the engaging element from the base plate is 0.35 to 0.75, and a base plate covering ratio of the engaging element is 25 to 45%.

Particularly, if the combination with the male surface fastener having a special shape as described above is used, the above effects are more highly achieved.

Further, in the above male surface fastener, the engaging element of the male surface fastener preferably includes an adhesion preventing projection projecting in a direction away from the base plate at a position above the engaging projection. This is thought to reliably increase the value of the ratio (D/H).

Yet another aspect of the present invention relates to an engaging method using the loop surface fastener and the male surface fastener in combination.

Particularly, at the time of producing an automotive vehicle, if a wrong fixing position is chosen in an operation of fixing a ceiling material to a ceiling base material of the automotive vehicle or an operation of fixing a surface material for trunk room to a trunk room of the automotive vehicle at a production line moving at a constant speed, an operation of disengaging the engagement and fixing the material again is necessary. This disrupts the production line and necessitates an action such as a reduction in the speed of the production line. However, if the loop surface fastener of the present invention as described above is used, positioning is facilitated, wherefore displacements can be reduced and it is not necessary to reduce the production line speed or stop the production line as before.

Further, if the loop surface fastener of the present invention is used to attach a ceiling material and a wall material in interior finishing of a house or the like, it is possible to prevent displacements, reduce labor hours and prevent the damage of the ceiling material and the wall material in detaching the displaced ceiling material and the wall material. Particularly, if an object to be attached is large, the effect of using the male molded surface fastener of the present invention is very large. Further, in the case of using the combination of the loop surface fastener and the male surface fastener specified in the present invention, these effects can be more prominently obtained.

EXAMPLES

Hereinafter, the present invention is described in detail by way of examples. Note that an engagement force was measured by peeling an engaging surface in a vertical direction in accordance with a method described in JIS L3416.

When observing pressure normally occurring at the time of positioning, the present inventors found that it was about 100 g/cm². Based on this fact, an engagement force at the time of positioning was defined as an engagement force produced when an engaging surface of a male surface fastener and that of a female surface fastener were pressed at 100 g/cm². Further, an engagement force at the time of final fastening was defined as an engagement force produced when the engaging surface of the male surface fastener and that of the female surface fastener were pressed at 500 g/cm².

Example 1

[Manufacturing of Loop Surface Fastener]

Using multi-filament yarns composed of 30 filaments of 167 decitex made of polyethylene terephthalate as ground warp yarns, multi-filament yarns composed of 24 filaments of 99 decitex made of polyethylene terephthalate as ground weft yarns and multi-filament yarns composed of 7 filaments of 265 decitex made of polybutylene terephthalate as loop yarns for looped engaging element (one filament was 38 decitex in thickness), a gray fabric for surface fastener was fabricated by plain weaving at a weaving density of 75 ground warp yarns (including the yarns for looped engaging element)/cm and 20 ground weft yarns/cm. The looped engaging elements were formed by forming a loop every time the loop yarn slips under one ground weft yarn and emerges above the next ground weft yarn, and were kept from crossing the ground warp yarns. The obtained gray fabric was thermally treated at 160° C. and 35 g/m² of a polyurethane solution by solid content was applied to the underside of the gray fabric and dried, whereby a loop surface fastener was obtained.

The density of the looped engaging elements of the obtained loop surface fastener was 131/cm², and loop surfaces of all the looped engaging elements were facing in a ground weft yarn direction. The height of the looped engaging elements was 2.2 mm, a bundled state of the multi-filament was kept in any of the looped engaging elements and almost no filament separated from the bundle was found.

[Manufacturing of Male Molded Fastener]

Using the nozzle as shown in FIG. 4, a polyester resin was extruded and cooled to mold a tape-like object including a plurality of continuous rows having a cross-section of mushroom-shaped engaging elements which are successive in a length direction. There were ten continuous rows and the width of the tape-like object was 35 mm. Then, cuts were formed from the tips of the continuous rows to the vicinities of base ends at an interval of 0.5 mm in a direction perpendicular to the continuous row length direction. Subsequently, the tape-like object was stretched 2.2-fold in the length direction. Each of obtained male engaging elements included an adhesion preventing projection (M) atop a head portion as shown in FIG. 2.

The height (H) of the engaging elements of the obtained male molded surface fastener was 2.5 mm, the distance (D) from top parts of the engaging elements to the lower end parts of the projections was 1.3 mm, an interval between the engaging projections of the male engaging element and those of the adjacent male engaging element in a projection direction (i.e. X direction shown in FIG. 2) was 1.0 mm, the projecting length of the engaging projections was 0.6 mm, the thickness of the male engaging elements in the engaging element row direction was 0.5 mm, the thickness of the stem portions of the engaging elements was 0.3 mm², the thickness of the base plate (B) was 0.2 mm and the engaging element density was 31/cm².

The obtained male molded surface fastener was adhered to a plastic plate, whereas the above-mentioned loop surface fastener was used as a female surface fastener to be engaged with this male molded surface fastener. The both surface fasteners were joined and peel strength was measured when the surface fasteners were pressed at 100 g/cm² and at 500 g/cm². As a result, no engagement occurred when the surface fasteners were pressed at 100 g/cm² and a peel strength of 25 N/cm² was obtained when the surface fasteners were pressed at 500 g/cm². From these results, it was confirmed that the male molded surface fastener was not engaged at the time of positioning, but was strongly engaged by normal pressing at the time of final fastening.

This male molded surface fastener was attached to the underside of a ceiling interior material of an automotive vehicle by an adhesive, whereas the loop surface fastener was attached to an iron plate of a ceiling portion of a vehicle body by an adhesive, and the both surface fasteners were joined for positioning. However, no engagement occurred and positioning could be easily performed. When an optimal position was determined and the ceiling interior material was pressed, the both surface fasteners were engaged and fixed with a sufficient engagement force.

Example 2

Both surface fasteners were engaged and peel strength at that time was measured as in the above Example 1 except that the male surface fastener was changed to a commercially available male woven surface fastener [A8693Y produced by Kuraray Fastening Co., Ltd.]. As a result, slight engagement occurred, but the engagement was easily disengaged when the pressure was released, thereby causing almost no problem in positioning when the surface fasteners were pressed at 100 g/cm². Further, a peel strength of 10 N/cm² was obtained when the surface fasteners were pressed at 500 g/cm².

Examples 3 to 6

A loop surface fastener was manufactured as in the above Example 1 except that the loop yarns were changed as shown in TABLE-1 and engaged with the male woven surface fastener as in the above Example 2, and peel strength at that time was measured. Results are shown in TABLE-1. In any of the cases, it was confirmed that no such engagement as to cause a problem occurred at the time of positioning and strong engagement occurred by normal pressing after final fastening.

TABLE 1

| | | Example 3 | Example 4 | Example 5 | Example 6 |
|---|---|---|---|---|---|
| Loop yarn | Filament thickness [single fiber] (decitex) | 32 | 42 | 38 | 38 |
| | Number of filaments | 7 | 7 | 5 | 9 |
| Peel strength at pressing pressure of 100 g/cm² (N/cm²) | | Almost no engagement | Almost no engagement | Almost no engagement | Almost no engagement |
| Peel strength at pressing pressure of 500 g/cm² (N/cm²) | | 13 | 8 | 9 | 11 |

Comparative Examples 1 to 4

A loop surface fastener was manufactured as in the above Example 1 except that the loop yarns were changed as shown in TABLE-2 and engaged with the male woven surface fastener as in the above Example 2, and peel strength at that time was measured. Results are shown in TABLE-2. In the case of Comparative Examples 1 and 3, engagement occurred at a pressing pressure of 100 g/cm² to cause a trouble in a positioning operation. In the case of Comparative Examples 2 and 4, an engagement force at a pressing pressure of 500 g/cm² was poor.

TABLE 2

| | | Comparative Example 1 | Comparative Example 2 | Comparative Example 3 | Comparative Example 4 |
|---|---|---|---|---|---|
| Loop yarn | Filament thickness [single fiber] (decitex) | 25 | 50 | 38 | 38 |
| | Number of filaments | 7 | 7 | 3 | 12 |
| Peel strength at pressing pressure of 100 g/cm² (N/cm²) | | 17 | Almost no engagement | 15 | Almost no engagement |
| Peel strength at pressing pressure of 500 g/cm² (N/cm²) | | 35 | 3 | 32 | 4 |

Example 7

A loop surface fastener was manufactured as in the above Example 1 except that an insertion interval of the ground warp yarns was widened to 70/cm. The density of engaging elements of this loop surface fastener was 120/cm², this loop surface fastener was engaged with the male woven surface fastener as in Example 2 and peel strength was measured. As in the case of Example 2, slight engagement occurred, but the engagement was easily disengaged when the pressure was released, thereby causing almost no problem in positioning when the surface fasteners were pressed at 100 g/cm². Further, a peel strength of 12 N/cm² was obtained when the surface fasteners were pressed at 500 g/cm².

Example 8

A loop surface fastener was manufactured as in the above Example 1 except that an insertion interval of the ground warp yarns was narrowed to 80/cm. The density of engaging elements of this loop surface fastener was 140/cm², this loop surface fastener was engaged with the male woven surface fastener as in Example 2 and peel strength was measured. Lighter engagement than in the case of Example 2 occurred, but the engagement was easily disengaged when the pressure was released, thereby causing almost no problem in positioning when the surface fasteners were pressed at 100 g/cm². Further, a peel strength of 13 N/cm² was obtained when the surface fasteners were pressed at 500 g/cm².

Comparative Example 5

A loop surface fastener was manufactured as in the above Example 1 except that a loop was formed every time a loop yarn sinks and emerges through four ground weft yarns and the density of looped engaging elements was 65/cm². As in the case of Example 2, this loop surface fastener was engaged with the male woven surface fastener and peel strength was measured. As a result, it could be confirmed that strong engagement occurred at the time of positioning (10 N/cm² at a pressing pressure of 100 g/cm²) and there was no positioning function.

Comparative Example 6

In the above Example 1, it was attempted to manufacture such a loop surface fastener that loop yarns were used at a ratio of one loop yarn to two warp yarns and an insertion interval of the ground warp yarns was narrowed to 90/cm to obtain a looped engaging element density of 240/cm², but weaving was not possible due to the extremely narrow insertion interval.

Comparative Example 7

In the above Example 1, the surface of the loop surface fastener was napped as done with commercially available surface fasteners to loosen the multi-filament yarns of the engaging elements of the loop surface fastener prior to the application of the back coat resin. As a result, the loop surfaces of the looped engaging elements were not facing in the specified direction and not uniform. The multi-filament yarns forming the looped engaging elements became loose near loop tops and numerous filaments projecting from the loops and singly forming loops were found. Beside those, the loop surface fastener was manufactured as in Example 1 and engaged with the male woven surface fastener as in Example 2. Then, peel strength was measured. As a result, it was confirmed that strong engagement of 13 N/cm² occurred when the surface fasteners were pressed at 100 g/cm² and there was no positioning function.

This application is based on Japanese Patent Application No. 2011-272897 filed with the Japan Patent Office on Dec. 14, 2011, and the contents of which are hereby incorporated by reference.

To express the present invention, the present invention has been properly and fully described through the embodiment with reference to the drawings above, but it should be appreciated that a person skilled in the art can easily modify and/or improve the aforementioned embodiment. Therefore, a modification or improvement practiced by the person skilled in the art is construed to be embraced by the scope of claims unless such a modification or improvement departs from the scope of claims.

INDUSTRIAL APPLICABILITY

The present invention has wide industrial applicability in the technical field of surface fasteners.

The invention claimed is:

1. A loop surface fastener, comprising:
numerous looped engaging elements having loop yarns present in parallel to ground warp yarns,
wherein
the looped engaging elements are placed upright on one side of a base fabric consisting of ground warp yarns and ground weft yarns, wherein at least requirements 1), 2), and 3) are satisfied:
1) the loop yarns are multi-filament yarns consisting of 5 to 9 bundled filaments of 30 to 45 decitex,
2) the density of the looped engaging elements is from 100 to 200/cm², and
3) looped surfaces of the looped engaging elements are substantially facing in the same direction and the loop surface facing direction is a ground weft yarn direction.

2. The loop surface fastener according to claim 1, wherein
the multi-filament yarns forming the looped engaging elements are comprised of polybutylene terephthalate-based polyester, and
both the ground warp yarns and the ground weft yarns are multi-filament yarns comprised of polyethylene terephthalate-based polyester.

3. The loop surface fastener according to claim 1, wherein the multi-filament yarns forming the looped engaging elements are present in a base fabric in parallel to the ground warp yarns so as not to cross the ground warp yarns.

4. The loop surface fastener according to claim 1, wherein a looped engaging element is formed every time loop yarn slips under one ground weft yarn and emerges above an adjacent ground weft yarn.

5. The loop surface fastener according to claim 1, wherein the height of the looped engaging elements from the base fabric surface of from 1.5 to 2.8 mm.

6. The loop surface fastener according to claim 1, wherein the looped engaging elements are formed of multi-filament yarns in a bundled state.

7. A method for fixing a ceiling material to a ceiling base material, the method comprising:
fixing the loop surface fastener according to claim 1 to either one of the ceiling base material and the ceiling material,
attaching a surface fastener engageable with the loop surface fastener to the other, and engaging both surface fasteners.

8. A method according to claim 7, wherein the ceiling base material is a ceiling base material of an automotive vehicle.

9. A combination, comprising:
the loop surface fastener according to claim 1, and
a male surface fastener as an engagement mate of the loop surface fastener,
wherein
the male surface fastener comprises numerous male engaging elements placed upright on a surface of a plastic base plate,
each male engaging element comprises a stem standing up from the plastic base plate and an engaging projection laterally projecting from the stem,
a ratio (D/H) of a distance (D) from a top part of the engaging element to a lower end part of the projection to a height (H) of the engaging element from the base plate is 0.35 to 0.75, and
the engaging element has a base plate covering ratio of from 25 to 45%.

10. The combination according to claim 9, wherein the male engaging element comprises an adhesion preventing projection projecting in a direction away from the base plate at a position above the engaging projection.

11. An engaging method, comprising:
using the combination according to claim 9 in the method.

* * * * *